United States Patent Office 3,324,363
Patented June 6, 1967

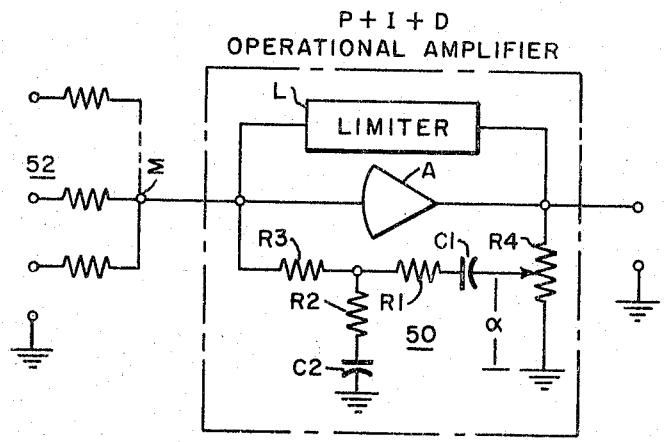
Fig. 2
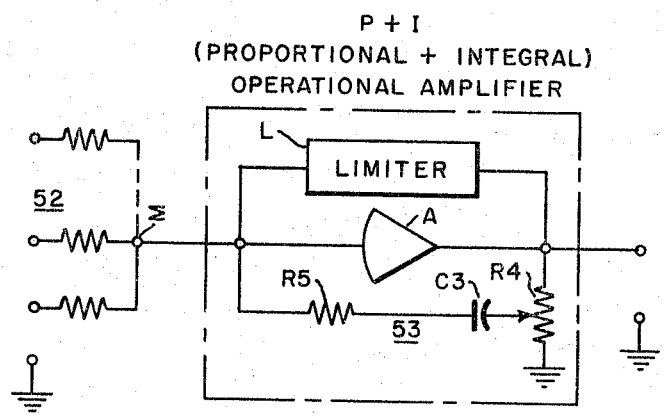
Fig. 3
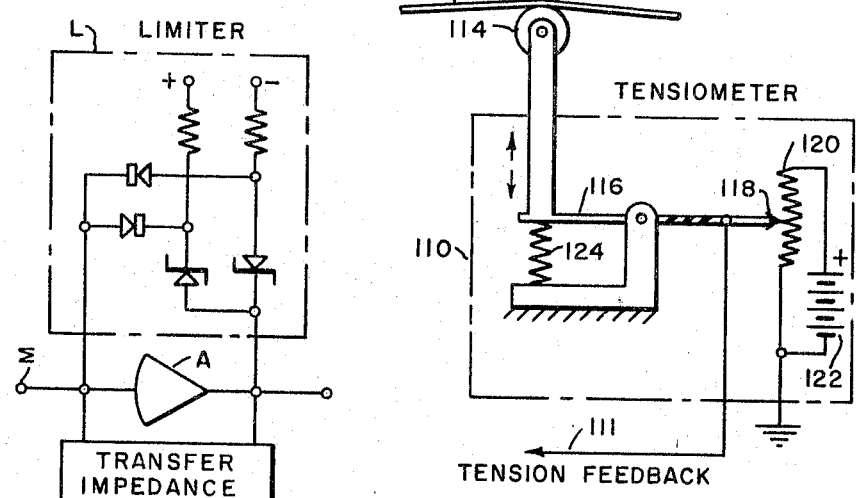
Fig. 4
Fig. 5

3,324,363
MOTOR CONTROL SYSTEM FOR SPEED AND TENSION OF MOVING ELONGATE MATERIAL
Earl R. Hill, Plum Boro, and Woodward C. Carter II, Pittsburgh, Pa., assignors to Westinghouse Electric Corporation, Pittsburgh, Pa., a corporation of Pennsylvania
Filed Apr. 30, 1964, Ser. No. 363,825
12 Claims. (Cl. 318—6)

This invention relates to apparatus for controlling a variable of travelling elongate material moved by a mechanism driven by an electric motor, the variable being one whose departure from a norm is correctable by controlling the speed of the motor. More particularly the invention is directed to apparatus for controlling the tension of travelling strip material, for example paper strip in paper processing apparatus.

A major problem in paper processing is maintenance of uniform tension on paper strip as it travels from section to section of a paper process line, for example between stacks of calendar rolls, between pull rolls and coater sections, etc.

Heretofore economically feasible servo systems for controlling tension have been limited in accuracy, stability and response speed, due to the economic necessity of limiting the engineering effort and equipment complexity allotted to the system.

It is an object of the present invention to provide a new servo-system for controlling a variable of travelling elongate material.

Another object of the invention is to provide a servo-system having a very high response speed and accuracy for regulating a variable of motor driven elongate material, which variable is controllable by controlling the speed of the motor.

Another object is to provide such a system having a plurality of superposed regulating loops, and having consistent and predictable response time and response form, thus requiring less than usual engineering time in the design thereof.

Yet another object of the invention is to provide a system capable of being designed and adjusted for optimum response characteristics by algebraic formulae requiring no extensive cut and try design procedures or computer simulation.

Still another object of the invention is to provide a system having improved speed of response, high accuracy, and a high degree of stability for regulating a variable of motor driven elongate material, which variable is controllable by controlling the speed of the motor.

A further object of the invention is to provide a strip tension regulating system wherein one or more of the above objects is realized.

The aforesaid objects are attained in accordance with one embodiment of the invention, which embodiment contemplates a regulating system wherein there are cascaded in the following order a tension loop, a speed loop and a current regulating loop, each loop including a P+I (proportional plus integral) or a P+I+D (proportional plus integral plus derivative) controller. To restrain power transfers within equipment capabilities and to improve the system operating characteristics, limiters are employed to limit the output of each controller before it is applied to the following controller.

Another aspect of the invention is directed to an arrangement wherein the current regulating loop automatically operates to regulate voltage when the main contactor in the armature circuit of the motor is open.

Other and further objects and advantages of the invention will become apparent from the following detailed description taken in connection with the drawings wherein a preferred embodiment of the invention is illustrated.

In the drawings:

FIG. 2 is a diagram illustrating the general case for a P+I+D operational amplifier which may be employed as a controller in each of the regulating loops of the system of FIG. 1;

FIG. 3 is a diagram illustrating the general case for a P+I operational amplifier which alternatively may be employed instead of any of the P+I+D controllers;

FIG. 4 is a diagram illustrating a feedback type limiter which may be employed in connection with any of the operational amplifiers illustrated; and FIG. 5 is a diagram of one form of tensiometer which may be employed to sense tension in the system of FIG. 1.

Figure 1:
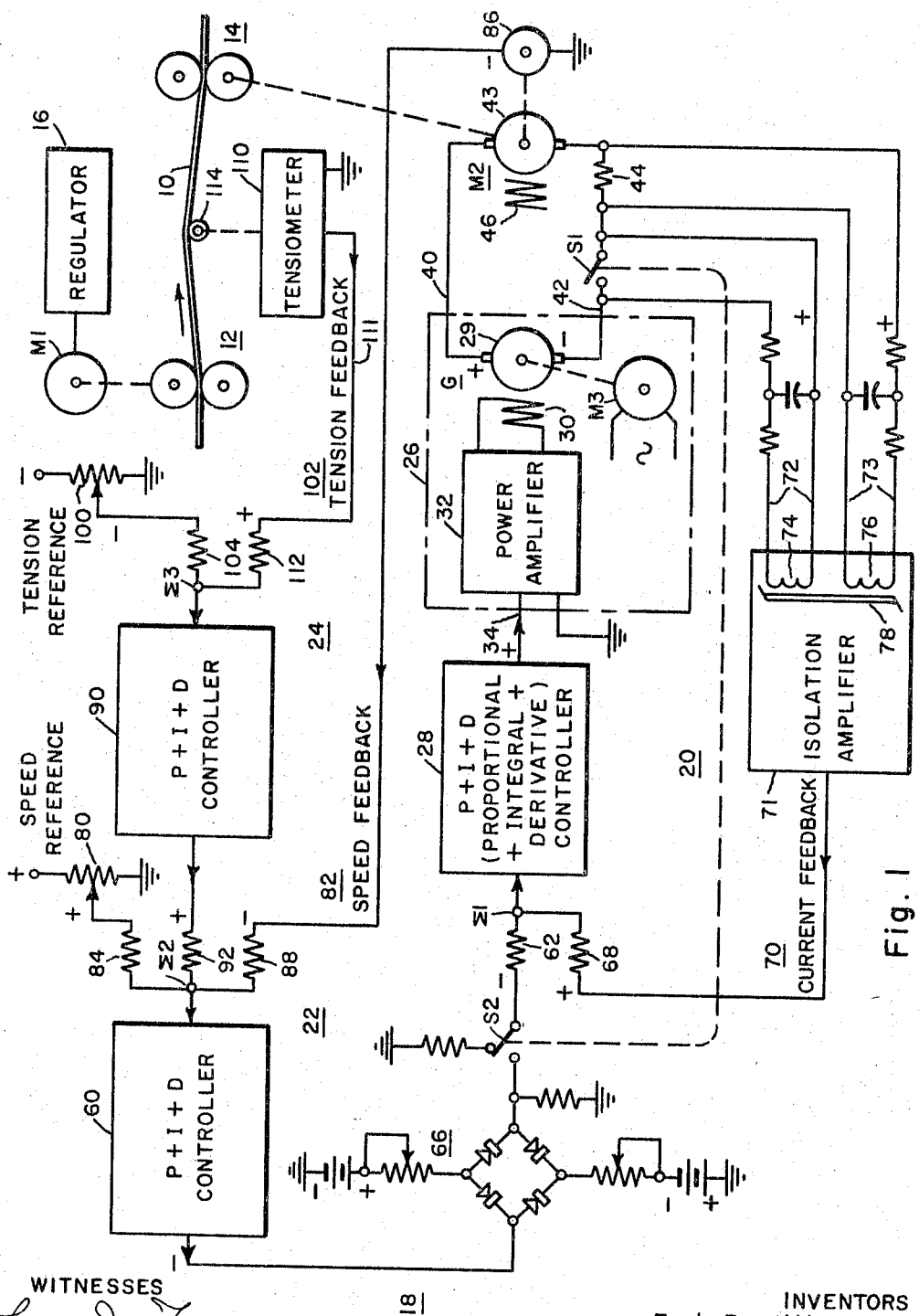
FIGURE 1 is a diagram of a paper mill strip tension regulator embodying the invention.

Referring now to FIG. 1 the system shown therein provides tension control for paper strip 10 travelling along a course between sections in a paper making or processing machine. By way of example the sections are shown as sets of press rolls 12 and 14. The set of rolls 12 is driven by a motor M1 controlled by a regulator 16, while the roll set 14 is driven by a motor M2 controlled by a regulator 18.

The regulator 18 has three regulating loops, an inner loop 20, an intermediate loop 22 superposed on the inner loop, and an outer loop 24 superposed on the intermediate loop. The inner loop 20, during normal operation, is a current regulating loop and includes a power supply source 26, which responds to a P+I+D controller 28, which in turn is responsive jointly to the output of the speed loop and a negative feedback signal that is a function of the current supplied to the motor.

The power supply source 26 provides an output to the motor M2 that is a function of an input control parameter, for example the output voltage of the source 26 is proportional to the magnitude of an input control signal supplied by the P+I+D controller 28. By way of example the power supply 26 is shown as comprising a D.C. generator G having an armature 29 and a main field 30 energized by the output of a power amplifier 32 whose control input circuit is coupled to and responds to the output of controller 28. Amplifier 32 provides an average D.C. output voltage that is proportional to control signals applied to its control input line 34, which in this example is connected to the output line of controller 28. Amplifier 32 may be of any suitable type for example it may have an output stage employing semiconductor controlled rectifiers that are phase controlled by gating circuits in response to input control signals supplied on line 34. The generator armature 29 supplies power to the power output lines 40 and 42 of the power supply source. The generator G is shown as being driven by a suitably powered electric motor M3.

The output line 40 of the power supply 26 is connected to one terminal of the armature 43 of motor M2, while the other output line 42 of the power supply is connected to one terminal of a switch S1 whose other terminal is connected through a resistance 44 to the other side of the motor armature 43. Motor M2 is provided with a main field 46 connected to a suitable source of power (not shown). Both the generator G and the motor M2 may have series field windings which are omitted to simplify the illustration. The power supply circuit of the motor is a series loop including the output circuit 40–42 of the power supply source 26, motor M2, a resistor 44, and a switch S1. When switch S1 is closed the main armature circuit of motor M2 is energized. Motor M2 is mechanically coupled to and drives rolls 14. If desired the power amplifier 32 may be arranged to supply motor M2 directly, in which case the intervening generator G is eliminated, and the output lines of amplifier 32 are connected directly to lines 40 and 42.

Controller 28 is either a P+I+D controller as indicated, or a P+I controller. A P+I+D controller is one whose output is proportional respectively to its input plus the integral of its input plus the derivative of its input. The transfer function of a P+I+D controller may be written as follows:

$$\frac{\text{Output}}{\text{Input}} = K_P + \frac{K_I}{S} + K_D S$$

where $K_P$ = proportional gain,
$K_I$ = integral gain,
$K_D$ = derivative gain, and
$S$ = Laplace operator From the above it is seen that a P+I+D controller provides an electrical output signal arrangement having a component proportional to the input, plus a component proportional to the time integral of the input, plus a component proportional to the time derivative of the input.

It should be understood that, while a "pure" P+I+D is desirable in the ideal system, as a practical matter to reduce "noise response" the P+I+D may be modified to limit the high frequency response to the extent necessary so that system "noise" will not disturb the application. Since the high frequency "end" of the P+I+D is the rate portion, such a limitation on the high frequency response results in a P+I+D with an approximate rate portion. However even with such a modified P+I+D the response over the operating range of frequencies of the system will be true P+I+D within the limit of component capabilities.

A P+I controller is one whose output is proportional to its input and the time integral of its input. The transfer function of a P+I controller may be written as follows:

$$\frac{\text{Output}}{\text{Input}} = K_P + \frac{K_I}{S}$$

where $K_P$ = proportional gain,
$K_I$ = integral gain, and
$S$ = Laplace operator From the above it is seen that a P+I controller provides an electric output signal arrangement having a component proportional to the input plus a component proportional to the integral of the input.

From the foregoing transfer functions of the P+I and the P+I+D controllers, it should be apparent that if the term $K_D$ in the transfer function $$K_P + \frac{K_I}{S} + K_D S$$

goes to zero, then that transfer function becomes that of a proportional plus integral controller. From this it can be seen that a controller which is described as having a transfer function $$K_P + \frac{K_I}{S} + K_D S$$

where the term $K_D$ is any real value ranging from zero upwards, the controller is either a P+I or a P+I+D, depending on the value of $K_D$. Where $K_D$ is zero the controller is a P+I controller.

Preferably, controller 28 is an operational amplifier having the proper feedback network or transfer impedances to provide P+I or P+I+D characteristics as desired. An example of a P+I+D operational amplifier suitable for use as any of the controllers 28, 60, and 90, is shown in FIG. 2 wherein A is a high gain, substantially drift-free, D.C. amplifier, and 50 is the transfer or feedback impedance network. For "pure" P+I+D in the ideal system the value of resistor R2 is zero. However, if it is necessary to limit the response to high frequencies to correct noise problem sufficient resistance may be inserted at R2 to reduce the high frequency response without losing the P+I+D characteristic over the range of operating frequencies of the system. Input signals are applied to the amplifier through input resistors 52 connected to a summing junction Σ connected with the amplifier input. One way of obtaining drift-free performance in an operational amplifier is the well known chopper stabilization technique.

The P+I+D in FIG. 2 becomes a P+I if resistor R3 is made zero or if resistor R2 is open. Potentiometer R4 is a gain adjustment. A pure P+I+D operational amplifier transfer impedance (FIG. 2, with R2=zero) may be seen in "Electronic Analog Computers," second edition by Korn and Korn (McGraw-Hill), page 418, fifth horizontal row, wherein the listed transfer function $$\frac{1}{PB}(1+PT_1)(1+PT_2)$$

with P the Laplace operator, is equivalent to $$K_P + \frac{K_I}{S} + K_D S$$

with S the Laplace operator.

In FIG. 3, there is shown an example of a P+I operational amplifier wherein the P+I transfer feedback impedance network is indicated at 53. The equivalent of the P+I of FIG. 3 is shown in the referred to publication on page 415 at 1.3, wherein the transfer function $$-\frac{R_0CP+1}{R_1CP}$$

is equivalent to $$K_P + \frac{K_I}{S}$$

In FIGS. 2 and 3, the operational amplifiers are shown with feedback type output limiters L, an example of which is shown in FIG. 4. Output limiters are generally used with operational amplifiers, having energy storing feedback elements, to prevent saturation of the amplifier and resulting "hang-up" or "wind-up" problems. The feedback type output limiter shown in FIG. 4 operates through the use of biased feedback diodes between the output and the summing junction Σ of the amplifier. The bias voltage for these feedback diodes is established by Zener diodes so that when the output voltage exceeds the Zener voltage, the feedback diodes become conductive and cause the resistance between the output and summing junction of the amplifier to become a low value thus preventing the output from further increasing. These limiters effectively limit the output voltage and at the same time retain the loop gain so that the summing junction is not displaced from zero potential. "Hang-up" is caused by the loss of amplifier loop gain, which may be due to saturation or circuit malfunction such as poor connection, chopper failure, or failure of a limiter circuit component. These limiters prevent amplifier saturation.

When a switch S2 (ganged with switch S1) is closed, a command or pattern signal derived from the output of a P+I+D controller 60 in the speed loop is applied to the summing junction Σ1 in the input of controller 28 through an input resistor 62 connected to the summing junction. The output line of controller 60 is connected through an adjustable limiter 66 to one side of switch S2. The limiter 66 by way of example is shown as a well known dual series, bridge-type limiter. A negative feedback signal proportional to motor armature current is applied through an input resistor 68 to the summing junction Σ1. The feedback signal is produced by a feedback circuit 70 which includes an isolation amplifier 71 whose output is connected to the input resistor 68. The amplifier 71 is provided with an input 72 connected across switch S1 and another input 73 connected across resistor 44 to provide to the input of the amplifier a control voltage proportional to the motor armature current when switch S1 is closed. The amplifier 71, effects isolation between input and output, and may be of any suitable type for example a magnetic amplifier as indicated symbolically by the control input windings 74 and 76 coupled to a square loop core 78 which carries the main windings (not shown) of the amplifier. If isolation and amplification are not required, the isolating amplifier may be dispensed with.

The current regulating loop 20 is so arranged that the command signal applied to input resistor 62 and the feedback signal applied to resistor 68 are summed to energize the controller 28 in such manner that the armature current in the armature circuit of the motor is regulated to a value which is a function of the signal applied to input resistor 62, and derived from the output of controller 60. The limiter 66 may be adjusted to prevent the motor armature current from going above a predetermined value. Except for the convenience of adjustment of limiter 66, the feedback-type limiter L in the controller 60 may also be designed or adjusted to limit the output of controller 60 in order to prevent the motor armature current from going above the predetermined limit.

Switches S1 and S2 are ganged so that they are both open or both closed at any given time. With both switches S1 and S2 closed the regulating loop 20 operates as a current regulator in the normal running mode of the system. However, when these switches are both open, the reference input of controller 28 is grounded and therefore the only significant signal applied to the controller 28 is a feedback signal produced by current flow through winding 74 which reflects the voltage across switch S1. The arrangement is such that under these circumstances the system operates to regulate the voltage across switch S1, which may be due to the generator output or to counter EMF of a coasting motor M2, to zero value since the command signal supplied through resistor 62 is zero. This prevents possible flashover and current surges when switch S1 is closed.

Besides the controller 60, the speed loop 22 includes an adjustable speed reference source 80 and a feedback circuit 82. The output of the speed reference source 80 is coupled to an input resistor 84 connected to the summing junction Σ2 in the input of controller 60. Source 80 supplies to the summing junction Σ2 a speed reference that is proportional to a desired speed for the strip 10 at the rolls 14.

Feedback circuit 82 applies to the summing junction Σ2 of controller 60 a signal which is a function of the actual speed of the strip 10 at the rolls 14. The feedback circuit 82 includes a D.C. tachometer generator 86 mechanically coupled to the motor M2. Since the speed of motor M2 is proportional to the speed of the strip 10 at the rolls 14, the output of tachometer 86 is proportional to the speed of the strip 10 at the set of rolls 14. The output of generator 86 is applied through an input resistor 88 to the summing junction Σ2 in negative feedback relation to the reference speed signal applied to that summing junction Σ2 through resistor 84 as modified by a signal derived from the output of a controller 90 and applied through an input resistor 92 to the summing junction Σ2. The arrangement of the speed regulating loop 22 and its relation to the current regulating loop 20 is such that the speed of motor M2 is regulated to a value dictated by the speed reference signal as modified by the output signal from controller 90 of the tension regulating loop 24.

Depending on the strip and processing machine characteristics and the stability, and speed of response desired or required, the controller 60 may be either a P+I+D controller as exemplified in FIG. 2 or a P+I controller as instanced in FIG. 3.

In addition to controller 90 the tension regulating loop 24 includes a tension reference source 100 and a tension feedback network 102. The tension reference source 100 applies to the input of controller 90 a signal which is a function of desired tension of the strip 10 in the path between the sections 12 and 14. More specifically the source 100 applies a voltage proportional to desired tension through a resistor 104 to a summing junction Σ3 connected to the input of controller 90. Feedback circuit 102 provides a negative feedback signal that is a function of the actual tension of a strip 10 to the input of controller 90. The tension signal is derived from a tensiometer 110 whose output is applied to the summing junction Σ3 through a line 111 and an input resistor 112. The output of tensiometer 110 is proportional to the tension of strip 10 along the path between roll sets 12 and 14.

The relation of the tension reference signal and the tension feedback signal as they are applied to the summing junction Σ3 is such that if the tension of the strip 10 departs from the desired norm set by the reference source 100, the controller 90 applies to the input of controller 60 a signal of the proper polarity and magnitude to cause the motor to change speed to correct for the tension error, that is to reduce the tension error.

The tensiometer 110 may be of any suitable type. An example is shown in FIG. 5 in which a sensing head 114 is linked to a spring loaded lever 116 and the arm 118 of a potentiometer 120 which is connected to a source of voltage such as the battery 122. The arm 118 is electrically connected to the resistor 112 through line 111. Downward thrust or pressure on the head 114 is resisted by a spring 124 coupled to the end of lever 116 which is centrally pivoted. The voltage at the potentiometer arm 118 is proportional to the vertical displacement of the sensing head 114 which in turn is a function of the tension in strip 10. While the output of tensiometer 110 is a function of the tension of strip 10, it is also proportional to or a function of the position or vertical displacement of the strip 10. Thus while the system disclosed with regulate the tension of the strip 10, it will also regulate the vertical displacement or position of the strip 10 so that the apparatus may be used to control the position of a looper in relation to a strip, wherein a detector responsive to looper position will provide an output signal that is a function of looper position and apply the signal to the summing junction Σ3 in lieu of the tensiometer signal.

As in the case of the other controllers 60 and 28, controller 90 may be either a P+I controller as shown for example in FIG. 3 or a P+I+D controller as shown for instance in FIG. 2. Any of the controllers 60, 28 and 90, may be either a P+I or a P+I+D controller, depending on which will provide the system accuracy, stability and response speed desired or required. In some cases a P+I controller at all of the controller stations (28, 60, 90) will be adequate to provide the required system response characteristics. On the other hand, the required system response in relation to the inherent response characteristics of the unregulated system may be such that a P+I controller will be inadequate, and in that case a P+I+D controller should be employed at one or more of the controller stations (28, 60, 90) as required. Where the P+I+D controller is used, it may be modified if desired by limiting its response to high frequencies to avoid disturbances due to system "noise." However even with such modification, the controller is still a P+I+D for the operating range of frequencies of the system.

In one example of operation, suppose that switches S1 and S2 are closed and the system is operating with the speeding strip 10 under a predetermined tension set by the position of the tension reference source 100 adjustment. For this condition let it be assumed that the polarities at various points in the system are as indicated in the drawings. If for some reason, for example change in temperature or humidity, the tension of the strip 10 decreases, the strip will be moved upward by the spring loading of the tension head 114, thus making the output of the tensiometer 110 less positive. This makes the output of controller 90 more positive, the output of controller 60 less positive, and the output of controller 28 more positive, assuming that the controllers are inverting operational amplifiers. The more positive ouput of controller 28 causes more power to be applied to motor M2 in the motoring direction thus to increase the motor speed and thereby increase the tension on strip 10 to the desired value set by the reference 100. In the meantime the speed feedback voltage (from tachometer 86) applied through resistor 88 to the summing junction Σ2 had gone more negative, and the current feedback supplied by the current feedback network 70 to the summing junction Σ1 had gone more positive. Eventually but rapidly the system reaches equilibrium at the chosen tension value.

If it is desired to increase the base speed, the output voltage of reference source 80 should be adjusted to a more positive reference value in order to supply a more positive speed reference current through resistor 84 to summing junction Σ2. Conversely, to reduce the base speed, the output voltage of reference source 80 must be adjusted to a less positive value in order to supply a less positive reference current to summing junction Σ2.

To increase the desired tension, the output voltage of the tension reference source 100 should be adjusted to a more negative value in order to provide a more negative reference current through resistor 104 to summing junction Σ3. On the other hand to reduce the desired tension, the reference source 100 must be adjusted to supply a less negative reference current to summing junction Σ3.

In the example shown in FIG. 1, controllers 60 and 90 are bi-directional, while the controller 28 is either bi-directional or unidirectional depending on whether the output voltage of the power amplifier 32 is bi-directional or unidirectional.

It is to be understood that the herein described arrangements are simply illustrative of the principles of the invention, and that other embodiments and applications are within the spirit and scope of the invention.

We claim as our invention:

1. In an apparatus for controlling elongate material being moved along a defined path by mechanism driven by an electric motor, first, second and third controller means, each controller means having respective input and output means, each controller means being constructed to provide an output comprising a component proportional to its input plus a component proportional to the time integral of its input, controllable power supply means connected to said motor for supplying current to the motor, means for controlling said power supply means in response to the output of the first controller means, means responsive to said current for producing a first feedback signal which is a function of the value of said current, means for energizing the input means of the first controller means in response jointly to the output of the second controller means and said first feedback signal in negative feedback relation thereby to regulate said current to a value dictated by the output of the second controller means, means responsive to the speed of said motor for producing a second negative feedback signal which is a function of the actual speed of said elongate material, means for providing a speed reference signal proportional to the desired speed of said elongate material, means for energizing the input means of the second controller means in response jointly to the output of the third controller means, the second negative feedback signal and the speed reference signal, whereby the speed of the motor is regulated to a value dictated by the speed reference signal as modified by the output of the third controller means, means responsive to a variable of said elongate material for providing a third feedback signal which is a function of the actual measure of said variable, means for providing a second reference signal proportional to the desired measure of said variable, said variable being one whose departure from a norm is correctable by controlling the speed of said motor, and means for energizing the input means of said third controller in response jointly to said second reference signal and said third feedback signal.

2. The combination as in claim 1 wherein said variable is tension of the elongate material.

3. The combination as in claim 1 wherein said variable is position of the elongate material.

4. In an apparatus for controlling elongate material being moved along a defined path by mechanism driven by an electric motor, first, second and third controller means, each controller means having respective input and output means, each controller means being constructed to provide an output comprising a component proportional to its input plus a component proportional to the time integral of its input, at least one of said controller means being constructed to additionally provide in its said output a component proportional to the derivative of its input, controllable power supply means connected to said motor for supplying current to the motor, means coupling the output of the first controller means to said power supply means to control said power supply means in response to the output of the first controller means, means responsive to said current for producing a first feedback signal dependent on the value of said current, means for energizing the input means of the first controller means in response jointly to the output of the second controller means and said first feedback signal in negative feedback relation whereby to regulate said current to a value dictated by the output of the second controller means, means responsive to the speed of said motor for producing a second negative feedback signal proportional to the actual speed of said elongate material, means for providing a speed reference signal proportional to the desired speed of said elongate material, means for energizing the input means of the second controller means in response jointly to the output of the third controller means, the second negative feedback signal and the speed reference signal, whereby the speed of the elongate material is regulated to a value dictated by the speed reference signal as modified by the output of the third controller means, means responsive to a variable of said elongate material for providing a third feedback signal proportional to the actual measure of said variable, means for providing a second reference signal proportional to the desired measure of said variable, said variable being one whose departure from a norm is correctable by controlling the speed of said motor, and means for energizing the input means of said third controller in response jointly to said second reference signal and said third feedback signal.

5. The combination as in claim 4 wherein said variable is tension.

6. The combination as in claim 4 wherein said variable is position.

7. The apparatus as in claim 1 wherein there is means for preventing the output of at least one of said controller means from exceeding a predetermined limiting value.

8. In an apparatus for controlling elongate material being moved along a defined path by mechanism driven by an electric motor, first, second and third controller means, each controller means having respective input and output means, each controller means being constructed to have a transfer function Output/Input which includes at least the term $$K_P + \frac{K_I}{S}$$

where $K_P$ = proportional gain,
$K_I$ = integral gain, and
$S$ = Laplace operator, controllable power supply means connected to said motor for supplying current to the motor, means for controlling said power supply means in response to the output of the first controller means, means responsive to said current for producing a first feedback signal proportional to the actual value of said current, means for energizing the input means of the first controller means in response to the difference between the output of the second controller means and said first feedback signal in negative feedback relation thereby to regulate said current to a value dictated by the output of the second controller means, means responsive to the speed of said motor for producing a second negative feedback signal which is a function of the actual speed of said elongate material, means for providing a speed reference signal proportional to the desired speed of said elongate material, means for energizing the input means of the second controller means in response to the summation of the output of the third controller means, the second negative feedback signal and the speed reference signal, whereby the speed of the elongate material is regulated to a value dictated by the speed reference signal as modified by the output of the third controller means, means responsive to a variable of said elongate material for providing a third feedback signal having a value dependent on the actual measure of said variable, means for providing a second reference signal proportional to the desired measure of said variable, said variable being one whose departure from a norm is correctable by controlling the speed of said motor, and means for energizing the input means of said third controller in response to the summation of the second reference signal and the third feedback signal.

9. The combination as in claim 8 wherein said variable is tension.

10. The combination as in claim 8 wherein said variable is position.

11. In an apparatus for controlling elongate material being driven along a defined path by mechanism including an electric motor, first, second and third controller means, each controller means having respective input and output means, each controller means being constructed to have a transfer function Output/Input which includes the term $$K_P + \frac{K_I}{S} + K_D S$$

where $K_P$=proportional gain,
$K_I$=integral gain,
$K_D$=derivative gain and may be any real value ranging from zero upwards, and
$S$=Laplace operator, controllable power supply means connected to said motor for supplying current to the motor, means for controlling said power supply means in response to the output of the first controller means, means responsive to said current for producing a first feedback signal proportional to the actual value of said current, means for energizing the input means of the first controller means in response jointly to the output of the second controller means and said first feedback signal in negative feedback relation thereby to regulate said current to a value dictated by the output of the second controller means, means responsive to the speed of said motor for producing a second negative feedback signal proportional to the actual speed of said elongate material, means for providing a speed reference signal proportional to the desired speed of said elongate material, means for energizing the input means of the second controller means in response jointly to the output of the third controller means, the second negative feedback signal and the speed reference signal, whereby the speed of the elongate material is regulated to a value dictated by the speed reference signal as modified by the output of the third controller means, means responsive to a variable of said elongate material for providing a third feedback signal proportional to the actual measure of said variable, means for providing a second reference signal proportional to the desired measure of said variable, said variable being one whose departure from a norm is correctable by controlling the speed of said motor, and means for energizing the input means of said third controller in response jointly to said second reference signal and said third feedback signal.

12. In an apparatus for controlling elongate material being moved along a defined path by mechanism driven by an electric motor, first, second and third controller means, each controller means having respective input and output means, each controller means being constructed to provide an output comprising a component proportional to its input plus a component proportional to the time integral of its input, a line, controllable power supply means connected through said line to said motor for supplying current to the motor, means for controlling said power supply means in response to the output of the first controller means, means responsive to said current for producing a first feedback signal which is a function of the value of said current, means for energizing the input means of the first controller means in response jointly to the output of the second controller means and said first feedback signal in negative feedback relation thereby to regulate said current to a value dictated by the output of the second controller means, means responsive to the speed of said motor for producing a second negative feedback signal which is a function of the actual speed of said elongate material, means for providing a speed reference signal proportional to the desired speed of said elongate material, means for energizing the input means of the second controller means in response jointly to the output of the third controller means, the second negative feedback signal and the speed reference signal, whereby the speed of the motor is regulated to a value dictated by the speed reference signal as modified by the output of the third controller means, means responsive to a variable of said elongate material for providing a third feedback signal which is a function of the actual measure of said variable, means for providing a second reference signal proportional to the desired measure of said variable, said variable being one whose departure from a norm is correctable by controlling the speed of said motor, means for energizing the input means of said third controller in response jointly to said second reference signal and said third feedback signal, a switch having open and closed modes connected in series in said line, means for concurrently (a) causing said switch to assume its open mode, and (b) blocking the output of said second controller means from the input of said first controller means, and means operable when said switch is in its open mode for supplying to the input of said first controller means a negative feedback signal responsive to the voltage across said switch in its open mode.

References Cited
UNITED STATES PATENTS
2,990,484 6/1961 Jones _____ 318—6 X
3,187,243 6/1965 Long _____ 318—6 X ORIS L. RADER, *Primary Examiner.*

B. A. COOPER, *Assistant Examiner.*